US012536512B1

(12) United States Patent
Warnick et al.

(10) Patent No.: US 12,536,512 B1
(45) Date of Patent: Jan. 27, 2026

(54) CORRESPONDENCE BETWEEN DIGITAL ASSETS AND PHYSICAL OBJECTS

(71) Applicant: United Services Automobile Association (USAA), San Antonio, TX (US)

(72) Inventors: Mark Paxman Warnick, San Antonio, TX (US); Will Kerns Maney, New York City, NY (US); Elena Marie Carrasco, Converse, TX (US); Nolan Serrao, Plano, TX (US); Ravi Durairaj, San Antonio, TX (US); Joel S. Hartshorn, Port Orchard, WA (US); Donald Nathaniel Holloway, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 71 days.

(21) Appl. No.: 17/948,924

(22) Filed: Sep. 20, 2022

Related U.S. Application Data

(60) Provisional application No. 63/249,821, filed on Sep. 29, 2021.

(51) Int. Cl.
*G06Q 20/10* (2012.01)
*G06Q 20/06* (2012.01)

(52) U.S. Cl.
CPC .................................. *G06Q 20/065* (2013.01)

(58) Field of Classification Search
CPC ...... G06Q 40/00; G06Q 40/065; G06Q 20/10; G06Q 20/065; G06Q 40/04; G06Q 40/06

USPC ....................................................... 705/39–42
See application file for complete search history.

(56) References Cited

U.S. PATENT DOCUMENTS

| | | | |
|---|---|---|---|
| 11,256,788 B2 * | 2/2022 | Goldston | H04L 9/3239 |
| 11,334,882 B1 * | 5/2022 | Jameson | H04L 9/3231 |
| 11,949,795 B2 * | 4/2024 | Young | H04L 9/3247 |
| 12,231,567 B1 * | 2/2025 | Khmelev | G06F 21/45 |
| 12,271,898 B1 * | 4/2025 | Arvanaghi | G06Q 20/10 |
| 12,400,221 B1 * | 8/2025 | Kendapadi | H04L 9/50 |
| 2020/0005284 A1 * | 1/2020 | Vijayan | G06Q 20/065 |
| 2020/0210978 A1 * | 7/2020 | Brown | G06Q 20/385 |
| 2020/0259653 A1 * | 8/2020 | Endress | H04L 9/3213 |
| 2022/0067984 A1 * | 3/2022 | Choi | G07F 17/3295 |
| 2022/0366061 A1 * | 11/2022 | Spivack | H04L 9/3271 |
| 2022/0383351 A1 * | 12/2022 | Atreya | H04L 9/3265 |
| 2023/0022844 A1 * | 1/2023 | Boyles | A63F 13/69 |
| 2023/0036724 A1 * | 2/2023 | Khalfan | G06Q 20/3829 |

(Continued)

OTHER PUBLICATIONS

Decentralized finance: On blockchain-and smart contract-based financial markets F Schär—FRB of St. Louis Review, 2021—papers.ssrn.com (Year: 2021).*

*Primary Examiner* — Hani M Kazimi
(74) *Attorney, Agent, or Firm* — Fletcher Yoder, PC (57) ABSTRACT

A system includes a physical object and one or more processors. The one or more processors are configured to receive physical object data indicative of a change to the physical object and identify a correspondence between the physical object and a non-fungible token (NFT). The one or more processors are also configured to incorporate, in response to identifying the correspondence and in a smart contract or digital distributed ledger, NFT data corresponding to the NFT and reflecting the change to the physical object.

20 Claims, 3 Drawing Sheets

(56) References Cited

U.S. PATENT DOCUMENTS

| | | | |
|---|---|---|---|
| 2023/0063245 A1* | 3/2023 | Young | H04L 9/3247 |
| 2023/0069258 A1* | 3/2023 | Duarte | G06Q 20/02 |
| 2023/0070389 A1* | 3/2023 | Madhusudhan | G06Q 10/083 |
| 2023/0162180 A1* | 5/2023 | Deng | G06Q 20/381 |
| | | | 705/64 |
| 2024/0064019 A1* | 2/2024 | Gagne-Keats | H04L 9/0825 |
| 2025/0182107 A1* | 6/2025 | Xiang | G06Q 20/3276 |

\* cited by examiner

CORRESPONDENCE BETWEEN DIGITAL ASSETS AND PHYSICAL OBJECTS

CROSS-REFERENCE TO RELATED APPLICATION

The present application claims benefit of and priority to U.S. Provisional Patent Application Ser. No. 63/249,821, titled "CORRESPONDENCE BETWEEN DIGITAL ASSETS AND PHYSICAL OBJECTS," which was filed on Sep. 29, 2021, and which is herein incorporated by reference in its entirety for all purposes.

BACKGROUND

The present disclosure relates generally to a correspondence between digital assets, such as those certified by a non-fungible token (NFT), and physical objects. More particularly, the present disclosure relates generally to causing a correspondence between a first change to an NFT with a second change to a physical object associated with the NFT, and vice versa.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In traditional systems, a digital asset, such as one certified by an NFT, includes data (or a smart contract) stored on a digital distributed ledger, such as a blockchain. The NFT generally certifies a uniqueness and/or ownership of the digital asset, and may relate to an assortment of digital asset types. For example, NFTs may be utilized in the field of social media, collectibles, ticketing, digital art, music, film, and the like. In certain circumstances, the NFT may function as a cryptographic token that can be exchanged from one owner to another via cryptographic transactions (or smart contracts) recorded on the blockchain. While NFTs have become more and more popular over time, a versatility and/or understanding of traditional NFTs may be limited to (or by) digital platforms.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a physical object and one or more processors. The one or more processors are configured to receive physical object data indicative of a change to the physical object and identify a correspondence between the physical object and a non-fungible token (NFT). The one or more processors are also configured to incorporate, in response to identifying the correspondence and in a smart contract or digital distributed ledger, NFT data corresponding to the NFT and reflecting the change to the physical object.

In another embodiment, a system includes a physical object, an electronically actuatable component of the physical object, and one or more processors. The one or more processors are configured to receive non-fungible token (NFT) data indicative of a first change to an NFT corresponding to a smart contract or digital distributed ledger. The one or more processors are also configured to identify, in a database, a correspondence between the NFT and the physical object. The one or more processors are also configured to implement, based on the NFT data indicative of the first change to the NFT and in response to identifying the correspondence, a second change to the electronically actuatable component of the physical object.

In another embodiment, a computer-implemented method includes storing, via one or more processors and in a database, data indicative of a correspondence between a non-fungible token (NFT) and a physical object. The method also includes receiving, via the one or more processors and based on a digital distributed ledger or blockchain, non-fungible token (NFT) data indicative of a first change to the NFT. The method also includes identifying, via the one or more processors, in the database, and based on the NFT data, a first instance of the correspondence between the NFT and the physical object. The method also includes implementing, via the one or more processors, based on the NFT data indicative of the first change to the NFT, and in response to identifying the first instance of the correspondence, a second change to the physical object. The method also includes receiving, via the one or more processors, physical object data indicative of a third change to the physical object. The method also includes identifying, via the one or more processors, in the database, and based on the physical object data, a second instance of the correspondence between the NFT and the physical object. The method also includes implementing, via the one or more processors, based on the physical object data indicative of the third change to the physical object, and in response to identifying the second instance of the correspondence, a fourth change to the NFT.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a correspondence between digital assets, such as those certified by a non-fungible token (NFT), and physical objects. More particularly, the present disclosure relates generally to causing a correspondence between a first change to an NFT with a second change to a physical object associated with the NFT, and vice versa.

In accordance with the present disclosure, a system includes a processor configured to receive, for example, data indicative of a change to a physical object. The processor may receive the data indicative of the change to the physical object via a sensor that monitors physical attributes or characteristics of the physical object. As an example, the physical object may include an expensive or rare bottle of wine. The sensor may be utilized to monitor whether the bottle of wine has been opened, an amount of wine left in the bottle, an amount of wine consumed or otherwise removed from the bottle, a changed location, position, or orientation of the wine bottle, a change to a digital display on or attached to the wine bottle, or another physical characteristic of the wine bottle. After receiving the data indicative of the change to the physical object (e.g., the change to the physical characteristic of the wine bottle), the processor may add, change, or update data indicative of a digital asset (or NFT) associated with the wine bottle. For example, the processor may add, change, or update data of a smart contract associated with the digital asset or NFT on a digital distributed ledger (e.g., blockchain) having the smart contract stored or recorded thereon. In some embodiments, the processor may add, change, or update data associated with the NFT via public-key cryptography (PKC) techniques and/or other cryptographic techniques.

Continuing with the above-described wine bottle, for example, data may be added to (or updated/changed on) the smart contract stored on the digital distributed ledger, indicating that the wine bottle has been opened, that a certain amount of wine remains in the wine bottle, that a certain amount of wine has been consumed or otherwise removed from the wine bottle, and the like. Additionally or alternatively, a change to a value of the wine bottle or the NFT (or both) associated with the opening of the wine bottle and/or removal of wine from the wine bottle may be reflected in the added, updated, or changed data.

Additionally or alternatively, the processor may receive data indicative of a change to the NFT or digital asset (or smart contract thereof). As an example, the NFT may be exchanged from one owner to another, and data indicative of the cryptographic transaction may be received by the processor. The processor may change or update an aspect of the physical object associated with the NFT or digital asset based upon the received data relating to the cryptographic transaction. In the example of the wine bottle, the NFT associated with the wine bottle may be transferred from one owner to another, and the transfer in ownership may be reflected on an electronically actuatable component of the wine bottle, such as an electronic display that presents a name of the owner and/or other data associated with the owner.

It should be noted that the above-described system and techniques, described in greater detail below with reference to the drawings, may have applicability in an assortment of digital asset types (e.g., social media content, collectibles, ticketing, digital art, music, film, and the like) and physical objects associated with the digital asset(s). By causing a correspondence between changes to a physical object and changes to an NFT or digital asset associated with the physical object (e.g., changing an aspect of the physical object in response to a change in an aspect of the NFT, and vice versa), NFTs may be more accessible and/or more easily conceptualized by a larger number of investors. Further, it should be noted that "add," "change," and "update" data indicative of the NFT may be used interchangeable herein. As an example, data indicative of the NFT stored to a smart contract (or digital distributed ledger) may be changed by adding data to pre-existing data or by updating the record of the NFT to incorporate additional data (e.g., reflective of a new owner of the physical object, the NFT, or both, or indicative of some other change to a physical characteristic of the physical object, as previously described). These and other features will be described in detail below with reference to the drawings.

Figure 1:
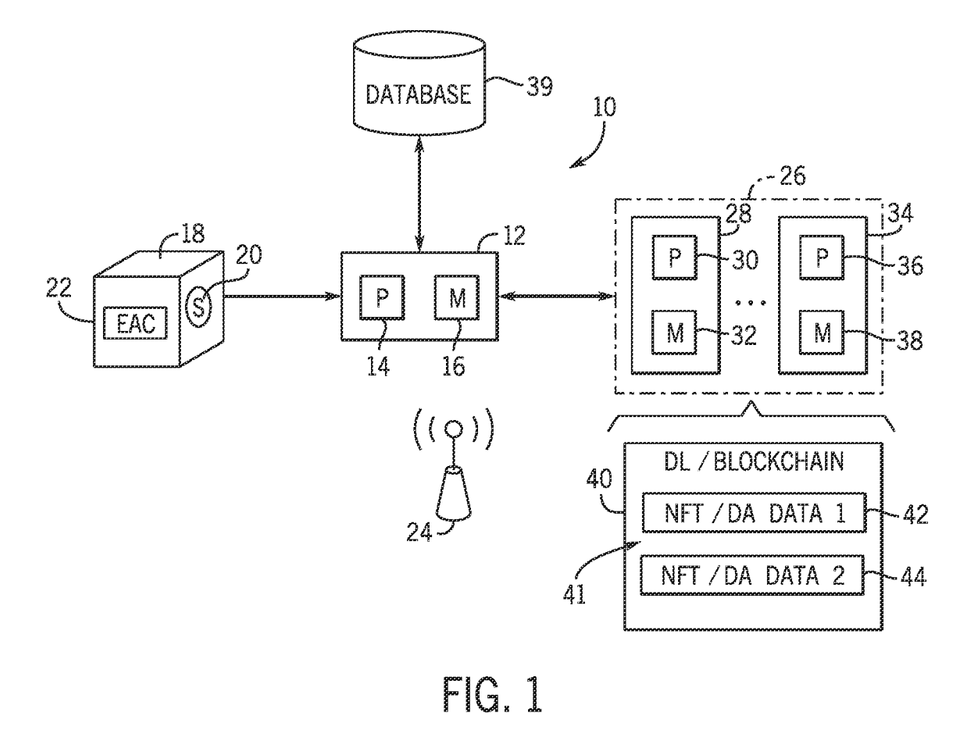
FIG. 1 illustrates a system utilized to cause a correspondence between changes in a non-fungible token (NFT) and changes in a physical object associated with the NFT, in accordance with an aspect of the present disclosure.

Turning now to the drawings, FIG. 1 illustrates an embodiment of a system 10 utilized to cause a correspondence between changes in a digital asset (or non-fungible token [NFT]) and changes a physical object associated with the digital asset or NFT (e.g., changing an aspect of the physical object in response to a change to the digital asset or NFT, and vice versa). The system 10 includes a computer 12 (referred to in certain instances as a controller) including a processor 14 and a memory 16. The memory 16 includes instructions stored thereon that, when executed by the processor, causes the processor 14 to perform various acts or functions. The computer 12 is communicatively coupled with certain aspects of a physical object 18, such as a sensor 20 of the physical object and/or an electronically actuatable component 22 of the physical object 18. It should be noted that only one instance of the computer 12 is shown in FIG. 1, but that multiple instances of the computer 12 may be employed to perform various functions. In other words, use of "computer" or "the computer 12" herein may refer to multiple different computing architectures.

A network 24, such as a Wi-Fi network, a cellular network, or the like, may be utilized to communicatively couple the computer 12 with the sensor 20 and/or the electronically actuatable component 22 of the physical object 18. The computer 12 is also communicatively coupled (e.g., via the network 24) with a computer network 26 including a number of additional computers, such as a first additional computer 28 having a first additional processor 30 and a first additional memory 32, and a second additional computer 34 having a second additional processor 36 and a second additional memory 38. In practice, the computer network 26 may include many computers (e.g., hundreds or thousands of computers) employed, for example, to share a digital distributed ledger or smart contract. The first additional computer 28 and the second additional computer 34 are merely provided as examples. In some embodiments, the computer 12 may also be considered a part of the computer network 26.

In general, the computer network 26 may be configured to store a digital distributed ledger 40 (e.g., decentralized digital distributed ledger), sometimes referred to as a blockchain. The digital distributed ledger 40 may store data indicative of one or more digital assets, such as those certified by an NFT 41 (e.g., where the NFT is unique cryptographic token captured in a record stored on the digital distributed ledger 40 or "blockchain"). The NFT 41 may certify, for example a uniqueness and/or ownership of the digital asset. In the illustrated embodiment, for example, the digital distributed ledger 40 includes first data 42 relating to a digital asset or NFT 41. Changes to the NFT 41 associated with the first data 42, such as a change in ownership or other attribute, may also be stored to the digital distributed ledger 40. For example, the second data 44 on the illustrated digital distributed ledger 40 may be recorded to the digital distributed ledger 40 and indicate a change of the NFT 41, such as a change in ownership or other attribute of the NFT 41. Certain data updates or changes (e.g., transactions) may be validated via public-key cryptography (PKC) techniques (e.g., involving one or more private keys associated with a transferor and/or transferee, one or more public keys associated with a transferor and/or transferee, or both) and/or other cryptographic techniques. The update or change (e.g., transaction) may be added to a "block" on the digital distributed ledger 40 and validated with the help of a consensus algorithm used by the computer network 26. In this way, each computer (e.g., the first additional computer 28, the second additional computer 34, and so on and so forth) of the computer network 26 may include a copy (e.g., in real-time or near real-time) of the digital distributed ledger 40.

The description below provides techniques for causing a correspondence between changes to the physical object 18 and changes to the NFT data (e.g., NFT record in the digital distributed ledger 40) associated with the physical object 18 (e.g., by changing the NFT data in response to the change in the physical object 18, and vice versa). In some embodiments, the computer 12 may identify a link between the physical object 18 and the digital asset or NFT 41 (e.g., where the link is stored in a database 39). For example, a pairing of the physical object 18 and the NFT 41, described in more detail below, may be stored in the database 39 and identified by the computer 12 to enable the computer 12 to perform various functions described below. The pairing (e.g., link, correspondence, association) between the NFT 41 and the physical object 18 may be stored in the database 39 prior to the system 10 causing a correspondence between changes in the NFT 41 and the in physical object 18.

In accordance with present embodiments, the system 10 may be configured to change an aspect of the physical object 18 in response to a change of an associated NFT 41 recorded on the digital distributed ledger 40, and/or to change an aspect of the NFT 41 recorded on the digital distributed ledger 40 in response to a change to the physical object 18 associated with the NFT 41. For example, in the event ownership of the NFT 41 is changed and recorded to the digital distributed ledger 40 (e.g., where the first NFT data 42 demonstrates a first owner of the digital asset and the second NFT data 44 demonstrates a second or subsequent owner of the digital asset), the change in ownership of the NFT may be reflected in the physical object 18. The electronically actuatable component 22 of the physical object 18, for example, may include a display that presents a name of the owner of the NFT 41 (and/or the physical object 18). When the ownership of the NFT 41 changes (e.g., as recorded in the second NFT data 44), the name on the electronically actuatable component 22 (e.g., display) of the physical object 18 also may be changed by the processor 14 of the computer 12.

Additionally or alternatively, a change to the physical object 18 may be reflected in a change to the NFT data recorded on the digital distributed ledger 40 (e.g., by adding the second NFT data 44 after the first NFT data 42 to form a record of the NFT 41). For example, the physical object 18 may include various physical attributes detectable by the sensor 20 (or a number of sensors including the sensor 20). In one embodiment, the physical object 18 may correspond to a wine bottle, and the sensor 20 may be configured to detect whether the wine bottle has been opened, an amount of wine left in the wine bottle, an amount of wine consumed or otherwise removed from the wine bottle, a location, position, or orientation of the wine bottle, and the like. Such changes to the physical object 18 may be detected by the sensor(s) 20, and data indicative of such changes may be received by the processor 14 of the computer 12. The processor 14 may then go about seeking to record the change to the digital distributed ledger 40. For example, the first NFT data 42 may include data indicative of the wine bottle being closed and/or full, whereas the second NFT data 44, recorded based upon the change to the wine bottle, may indicate that the wine bottle is open and/or half empty. In some embodiments, as described above, public-key cryptography (PKC) techniques may be employed to update the digital distributed ledger 40 (e.g., by recording the second NFT data 44).

While the example of the wine bottle described above is one instance in which the system 10 can reflect a change to a physical object with a corresponding change to an NFT 41 (and vice versa), other examples are also possible. For example, the physical object 18 may include a sealed envelope or package (e.g., where the sealed envelope or package includes sensitive material disposed therein), and the sensor 20 may detect an opening of the envelope or package. The processor 14 of the computer 12 may reflect the change to the package (e.g., opening of the package) with a change to the NFT 41 (e.g., by recording that the package is opened via the second NFT data 44). In such an example, the sensor 20 may additionally include a camera that detects or captures a person (e.g., a person's face) opening the package.

Additionally or alternatively, the sensor 20 may include a biometric sensor that detects or captures an identity of a person (e.g., via a thumbprint, retinal scan, etc.) opening the package. Data indicative of the person or the person's identity may be recorded via the second NFT data 44. In this way, the system 10 may be utilized in part for security purposes (e.g., such that a package delivery service may monitor various packages and delivery statuses). In another example, the physical object 18 may correspond to a physical artwork. A change to the physical artwork, such as a location of the physical artwork, unintentional damage to the physical artwork, intentional physical (e.g., markings) or digital overlays (e.g., light-based, virtual reality [VR] or augmented reality [AR] features viewable in a VR or AR environment, etc.) onto the physical artwork, etc., may be detected by the sensor 20, transmitted to the computer 12, and reflected in the NFT data (e.g., the second NFT data 44) associated with the NFT 41 corresponding to the physical artwork.

Figure 2:
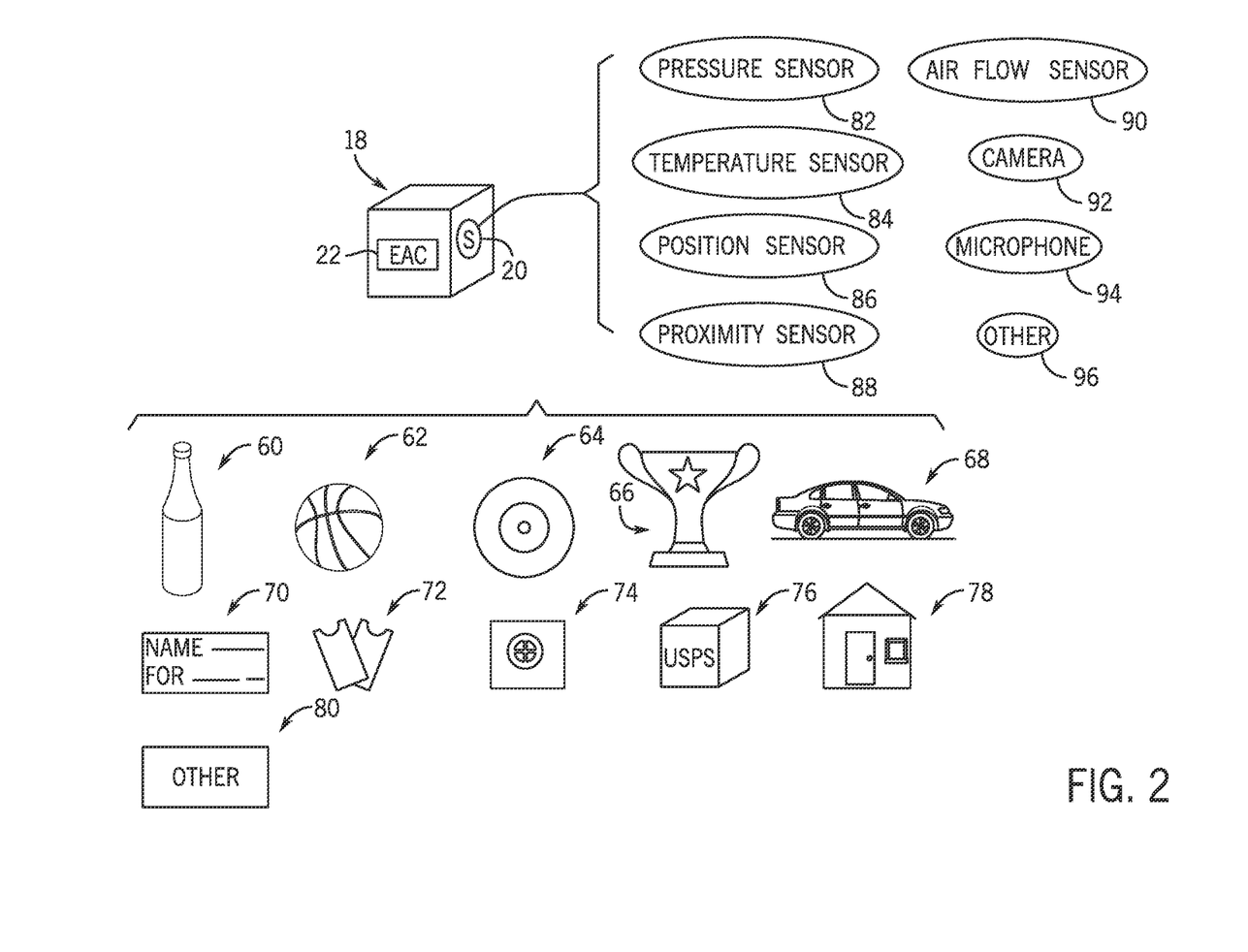
FIG. 2 illustrates various examples of the physical object employed in the system of FIG. 1, in accordance with an aspect of the present disclosure.

Other types of the physical object 18 are also possible. For example, various examples of the physical object 18 are illustrated in FIG. 2. These examples include, but are not limited to, a beverage container 60 (e.g., wine bottle), sports memorabilia or collectibles 62, music memorabilia collectibles 64 (e.g., vinyl records), awards 66 (e.g., trophies, military awards, and the like), vehicles 68, a check or money order 70, event tickets 72, safety deposit boxes 74, envelopes or packages 76, a house or other building 78, other items 80, and the like. In the case of awards 66, a physical version of the award 66 may correspond to the physical object 18 and a corresponding digital version may be the digital asset underlying the NFT 41. The sensor 20 utilized to monitor physical attributes of the physical object 18 may include a pressure sensor 82, a temperature sensor 84, a position sensor 86, a proximity (or location, such as geolocation) sensor 88, an air flow sensor 90, a camera 92, a microphone 94, or any other type of suitable sensor 96 for monitoring physical attributes of the physical object 18. Further, the electronically actuatable component 22 may be an electronically actuatable display.

Figure 3:
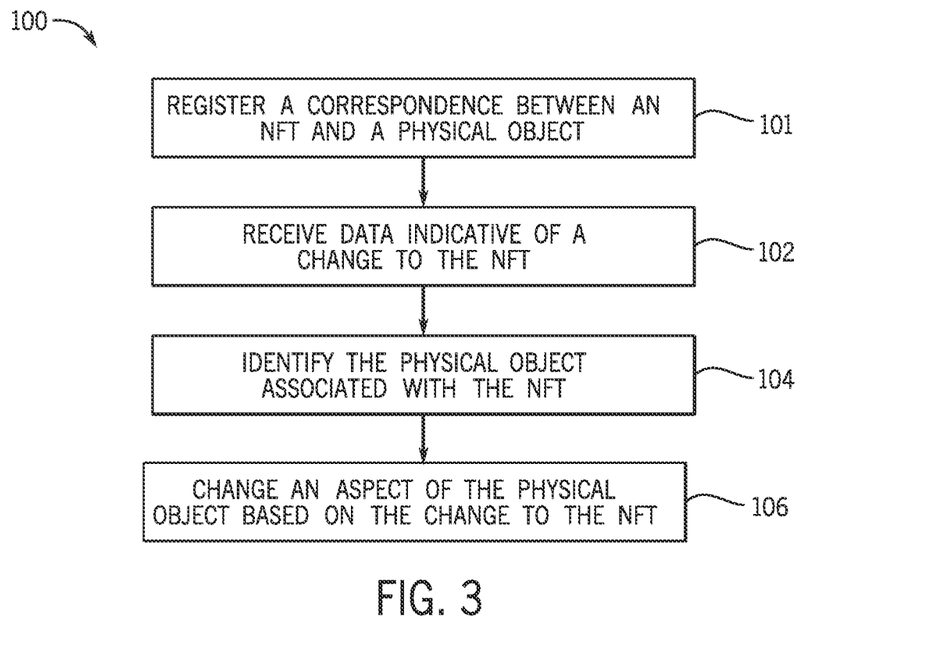
FIG. 3 is a process flow diagram illustrating a method by which the system of FIG. 1 causes a correspondence between a first change to an NFT with a second change to a physical object associated with the NFT, in accordance with an aspect of the present disclosure.

FIG. 3 is a process flow diagram illustrating an embodiment of a method 100 by which the system 10 of FIG. 1 causes a correspondence between a first change to an NFT and a second change to a physical object associated with the NFT (e.g., by changing an aspect of the physical object in response to a change in an aspect of the NFT). The method 100 includes registering (block 101) a correspondence between an NFT and a physical object. For example, a computer (e.g., one or more computers having one or more processors) may register the correspondence in a database. Data indicative of the correspondence may include, for example, identifying data associated with an aspect of the physical object and/or an aspect of the NFT, such that the link can be recalled in later steps of the method 100 as outlined below.

The method 100 also includes receiving (block 102), via a computer (or processor thereof), data indicative of a change to an NFT. For example, data indicative of the NFT may be stored to (or recorded on) a digital distributed ledger via a smart contract. As previously described, a computer network defining a number of nodes may include the digital distributed ledger (e.g., blockchain) stored thereon. After a change to (e.g., newly added block associated with) the NFT is validated by the computer network (e.g., via a consensus algorithm), a processor may receive data indicative of the change (or block). The change may include, for example, a change in ownership of the NFT. Other changes may also be possible. For example, the NFT may correspond to a digital artwork. A change to the digital artwork, such as an addition to (or subtraction from) an artistic or visual aspect of the digital artwork, may be recorded on the blockchain, and the processor may receive data indicative of the change.

The method 100 also includes identifying (block 104), via the computer (or processor thereof), a physical object associated with the NFT. As previously described, the physical object may include a wine bottle, a package, a sealed envelope, a security box, sports memorabilia, music collectibles, physical artwork (e.g., an electronic display depicting art), or a plethora of other similar physical objects. In some embodiments, identifying the physical object associated with the NFT may include identifying data stored to a database having a link between the NFT and data indicative of the physical object (e.g., a digital address or identifier associated with an electronic or network-connected component of the physical object, such as a digital display).

The method 100 also includes changing (block 106), via the computer (or processor thereof), an aspect of the physical object associated with the NFT based upon the data indicative of the change to the NFT. As previously described, the change to the physical object may include a change to an electronically actuatable component of the physical object, such as a digital display mounted to (or otherwise associated with) the physical object. Thus, an electronic display can be an evolving authenticated artwork. As another example, the change to the NFT may include a change in ownership of the NFT. The change in ownership to the NFT may be reflected in a change of a name displayed on the display of the physical object. Additionally or alternatively, the change to the NFT may correspond to a change in the value of the NFT, the physical object, or both. The display mounted to (or otherwise associated with) the physical object may present the value of the NFT, the physical object, or both, and any changes to the value may be updated on the display. The above-described display is one example of an aspect of the physical object that can be changed based on a change to the NFT, but other physical changes are also possible. For example, the physical object may include a light source that changes a color of the physical object based on a change to the NFT. Other electronically actuatable components associated with the physical object are also possible, such as a robotic or mechanical component.

Figure 4:
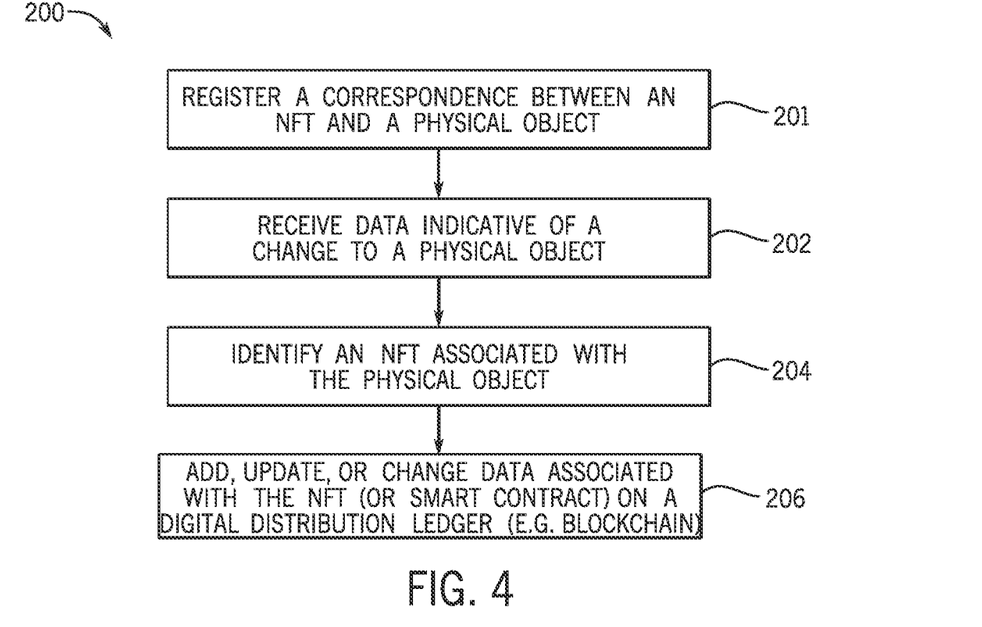
FIG. 4 is a process flow diagram illustrating a method by which the system of FIG. 1 causes a correspondence between a first change to a physical object with a second change to an NFT associated with the physical object, in accordance with an aspect of the present disclosure.

FIG. 4 is a process flow diagram illustrating an embodiment of a method 200 by which the system 10 of FIG. 1 causes a correspondence between a first change to a physical object and a second change to an NFT associated with the physical object (e.g., by changing an aspect of the NFT in response to a change in an aspect of the physical object). The method 200 includes registering (block 201) a correspondence between an NFT and a physical object. For example, a computer (e.g., one or more computers having one or more processors) may register the correspondence in a database. Data indicative of the correspondence may include, for example, identifying data associated with an aspect of the physical object and/or an aspect of the NFT, such that the link can be recalled in later steps of the method 200 as outlined below.

The method 200 includes receiving (block 202), via a computer (or processor thereof), data indicative of a change to a physical object. For example, as previously described, the change to the physical object may include a change to any physical attribute of the physical object. As earlier described in a previous example, the physical object may include a wine bottle, and the change to the wine bottle may include an opening of the wine bottle, a change to an amount of wine in the wine bottle, a change to an amount of wine consumed (or removed) from the wine bottle, etc. As another example, the physical object may include a physical artwork, and the change to the physical artwork may include unintentional damage, intentional physical or digital overlay(s), etc. The change may also include a changed position to the physical object. In general, one or more sensors may be utilized to detect the change to the physical object. The sensor(s) may include a pressure sensor, a temperature sensor, a position sensor, a proximity sensor, an air flow sensor, a camera, a microphone, or any other suitable sensor.

The method 200 also includes identifying (block 204), via the computer (or processor thereof), an NFT associated with the physical object. For example, the computer may search or query a database to locate a link between a digital identifier of the physical object and the NFT. The link and associated digital identifier(s) may be stored to the database, for example, upon generation (e.g., minting) of the NFT. The method 200 also includes adding, updating, or changing (block 206), via the computer (or processor thereof) and in some embodiments other computers of a computer network, data associated with the NFT (or smart contract) on a digital distributed ledger and based on the change to the physical object. As previously described, in some embodiments, public-key cryptography (PKC) techniques may be employed to add, change, or update data associated with the NFT (e.g., the smart contract) in the digital distributed ledger. In the above-described example of the wine bottle, the physical change to the wine bottle may include an opening of the wine bottle and/or a change to an amount of wine within the wine bottle. Such change may be reflected at block 204 in the NFT data corresponding to the NFT associated with the physical object.

Further, in certain embodiments, such as those in which the NFT corresponds to digital artwork or some other digital visualization, causing a correspondence between a change to the physical object and an aspect of the NFT may include, for example, a change to the digital artwork or digital visualization. That is, an artistic or visual aspect may be added to, subtracted from, or changed within the digital artwork or digital visualization in response to the change to the physical object. Other changes (e.g., to the NFT based on the change to the physical object, or vice versa) in accordance with the present disclosure are also possible.

Systems and methods in accordance with the present disclosure are directed toward a correspondence between digital assets, such as those certified by a non-fungible token (NFT), and physical objects. More particularly, the present disclosure relates generally to changing (e.g., updating, adding to, etc.) an aspect of an NFT in response to a change to a physical object associated with the NFT, and vice versa. Presently disclosed systems and techniques may improve a versatility, accessibility, understanding, and/or value of NFTs (and/or corresponding physical objects) compared to traditional embodiments.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a sealable container;
a sensor configured to detect an opening of the sealable container; and
a processing system comprising one or more processors, wherein the processing system is communicatively coupled with the sensor, and the processing system is configured to:
receive, from the sensor, sensor data indicative of the opening of the sealable container;
identify a correspondence between the sealable container and a non-fungible token (NFT); and
incorporate, based on the sensor data and identifying the correspondence, NFT data corresponding to the NFT and reflecting the opening of the sealable container into a smart contract or digital distributed ledger.

2. The system of claim 1, wherein the sensor comprises a pressure sensor, a position sensor, a proximity sensor, a camera, or a microphone.

3. The system of claim 1, wherein the processing system is configured to incorporate the NFT data corresponding to the NFT and reflecting the opening of the sealable container into the smart contract or the digital distributed ledger by adding the NFT data to pre-existing NFT data residing in the smart contract or the digital distributed ledger and corresponding to the NFT.

4. The system of claim 1, wherein the sealable container comprises a beverage container, a safety deposit box, an envelope, or a package.

5. The system of claim 1, wherein the processing system is configured to:
store, in a database, correspondence data indicative of the correspondence between the sealable container and the NFT; and
identify the correspondence between the sealable container and the NFT by querying the database and locating the correspondence data.

6. The system of claim 1, wherein the processing system is configured to:
receive, via the smart contract or the digital distributed ledger, additional NFT data indicative of an additional change to the NFT;
identify an additional instance of the correspondence between the sealable container and the NFT; and
control, based on the additional NFT data and identifying the additional instance of the correspondence, an electronically actuatable device coupled to, forming a part of, or disposed in the sealable container.

7. A system, comprising:
a sealable container;
an electronically actuatable device attached to, forming a part of, or disposed in the sealable container; and
one or more processors configured to:
receive non-fungible token (NFT) data indicative of a first change to an NFT corresponding to a smart contract or digital distributed ledger;
identify, in a database, a correspondence between the NFT and the sealable container; and
implement, based on the NFT data indicative of the first change to the NFT and identifying the correspondence, a second change to the electronically actuatable device.

8. The system of claim 7, wherein the NFT data indicative of the first change to the NFT comprises data indicative of an ownership change of the NFT.

9. The system of claim 7, wherein the processing system is configured to:
receive container data indicative of an opening of the sealable container; and
incorporate, based on the container data and identifying the correspondence, additional NFT data corresponding to the NFT and reflecting the opening of the sealable container into the smart contract or digital distributed ledger.

10. The system of claim 9, comprising one or more sensors, wherein the processing system is configured to receive the container data from the one or more sensors.

11. The system of claim 7, wherein the sealable container comprises a beverage container, a safety deposit box, an envelope, or a package.

12. The system of claim 7, wherein the processing system is configured to implement, based on the NFT data indicative of the first change to the NFT and identifying the correspondence, the second change to a digital display corresponding to the electronically actuatable device by changing an owner's name displayed on the digital display.

13. One or more tangible, non-transitory, computer readable media storing instructions thereon that, when executed by a processing system comprising one or more processors, are configured to cause the processing system to:
   receive, from a sensor, sensor data indicative of unsealing a package;
   identify a correspondence between the package and a non-fungible token (NFT); and
   incorporate, based on the sensor data and identifying the correspondence, NFT data corresponding to the NFT and reflecting the opening of the sealed package into a smart contract or digital distributed ledger.

14. The one or more tangible, non-transitory, computer readable media of claim 13, wherein the instructions, when executed by the processing system, are configured to cause the processing system to receive the sensor data from a pressure sensor corresponding to the sensor, a position sensor corresponding to the sensor, a proximity sensor corresponding to the sensor, a camera corresponding to the sensor, or a microphone corresponding to the sensor.

15. The one or more tangible, non-transitory, computer readable media of claim 13, wherein the instructions, when executed by the processing system, are configured to cause the processing system to incorporate, based on the sensor data and identifying the correspondence, the NFT data corresponding to the NFT and reflecting the unsealing of the container into the smart contract or digital distributed ledger by adding the NFT data to pre-existing NFT data residing in the smart contract or the digital distributed ledger and corresponding to the NFT.

16. The one or more tangible, non-transitory, computer readable media of claim 13, wherein the instructions, when executed by the processing system, are configured to cause the processing system to identify the correspondence between the container and the NFT by locating, in a database, correspondence data indicating the correspondence between the container and the NFT.

17. The one or more tangible, non-transitory, computer readable media of claim 13, wherein the instructions, when executed by the processing system, are configured to cause the processing system to:
   identify, in the smart contract or digital distributed ledger, additional NFT data indicative of an additional change to the NFT;
   identify an additional instance of the correspondence between the container and the NFT; and
   control, based on the additional NFT data and identifying the additional instance of the correspondence, an electronically actuatable device coupled to, forming a part of, or disposed in the container.

18. The one or more tangible, non-transitory, computer readable media of claim 17, wherein the instructions, when executed by the processing system, are configured to cause the processing system to control the electronically actuatable device by changing a visual presentation on a digital display corresponding to the electronically actuatable device.

19. The one or more tangible, non-transitory, computer readable media of claim 13, wherein the instructions, when executed by the processing system, are configured to cause the processing system to:
   receive, from a biometric sensor corresponding to either the sensor or an additional sensor, identity data corresponding to an identity of a person responsible for unsealing the container; and
   incorporate the identity data in the NFT data.

20. The one or more tangible, non-transitory, computer readable media of claim 13, wherein the instructions, when executed by the processing system, are configured to cause the processing system to:
   receive, from a camera corresponding to either the sensor or an additional sensor, at least one image or video of a person responsible for unsealing the container; and
   incorporate camera data related to the at least one image or video in the NFT data.

* * * * *